United States Patent
Kato et al.

(10) Patent No.: US 9,963,612 B2
(45) Date of Patent: May 8, 2018

(54) DISPLACEMENT PREVENTION COATING AGENT

(71) Applicant: Tokai Optical Co., Ltd., Okazaki-shi, Aichi (JP)

(72) Inventors: Atsushi Kato, Okazaki (JP); Kaname Hase, Okazaki (JP)

(73) Assignee: TOKAI OPTICAL CO., LTD., Okazaki-Shi, Aichi (JP)

( * ) Notice: Subject to any disclaimer, the term of this patent is extended or adjusted under 35 U.S.C. 154(b) by 0 days. days.

(21) Appl. No.: 15/314,775

(22) PCT Filed: May 27, 2015

(86) PCT No.: PCT/JP2015/065234
§ 371 (c)(1),
(2) Date: Nov. 29, 2016

(87) PCT Pub. No.: WO2015/182652
PCT Pub. Date: Dec. 3, 2015

(65) Prior Publication Data
US 2017/0198161 A1    Jul. 13, 2017

(30) Foreign Application Priority Data
May 30, 2014 (JP) ................................ 2014-112089

(51) Int. Cl.
*D06P 1/44* (2006.01)
*C09D 129/04* (2006.01)
*C09D 5/02* (2006.01)
*C09D 5/00* (2006.01)
*C09D 131/04* (2006.01)
*C09D 123/08* (2006.01)
*G02B 1/10* (2015.01)
*B24B 9/14* (2006.01)

(52) U.S. Cl.
CPC .............. *C09D 129/04* (2013.01); *B24B 9/14* (2013.01); *C09D 5/008* (2013.01); *C09D 5/022* (2013.01); *C09D 123/0853* (2013.01); *C09D 131/04* (2013.01); *G02B 1/10* (2013.01)

(58) Field of Classification Search
CPC ...... C09D 129/04; C09D 5/022; C09D 5/008; C09D 131/04; C09D 123/0853; G02B 1/10; B24B 9/14
USPC .......................................................... 524/46
See application file for complete search history.

(56) References Cited

U.S. PATENT DOCUMENTS

2008/0292787 A1 * 11/2008 Kim ........................ B24B 9/146
427/164

FOREIGN PATENT DOCUMENTS

| JP | 2004-122302 A | 4/2004 |
| JP | 2006-330677 A | 12/2006 |
| JP | 2013-050652 A | 3/2013 |
| WO | WO 2006/093113 A1 | 9/2006 |

OTHER PUBLICATIONS

International Search Report for PCT/JP2015/065234, dated Sep. 1, 2015, and English translation thereof (4 pages).

* cited by examiner

*Primary Examiner* — Hui Chin
(74) *Attorney, Agent, or Firm* — Bookoff McAndrews, PLLC

(57) ABSTRACT

A displacement prevention coating agent is provided which can prevent a displacement in lens processing, which is soluble in water and which exhibits a transparent appearance at least after being cured. The displacement prevention coating agent may coat the front and rear surfaces of a lens so that when cutting processing is performed on an end surface of the lens, a holding position of the front and rear surfaces of the lens held by a chuck device is prevented from being displaced. A water-repellent coat layer may be formed as a membrane such that the end surface has a shape corresponding to a frame. The displacement prevention coating agent may be formed of an aqueous solution whose main components are a hydrophilic resin, a surfactant having a perfluoro group and an emulsion.

20 Claims, No Drawings

DISPLACEMENT PREVENTION COATING AGENT

This application is a U.S. national stage filing under 35 U.S.C. § 371 of International Application No. PCT/JP2015/065234, filed on May 27, 2015, incorporated by reference herein in its entirety, which claims the benefit of priority to Japanese Patent Application No. 2014-112089, filed on May 30, 2014.

TECHNICAL FIELD

The present invention relates to a displacement prevention coating agent with which at least one of the front and rear surfaces of a lens is coated so that when cutting processing is performed on an end surface of the lens where a coat layer is formed as a membrane such that the end surface has a shape corresponding to a frame, a holding position where the front and rear surfaces of the lens are held by a holding means is prevented from being displaced.

BACKGROUND ART

Conventionally, in a lens, such as an eyeglass lens, which is put into a predetermined frame, a processing step is provided of cutting, by cutting processing, the surrounding (end surface) of a lens which serves as a precursor to process the lens into a shape corresponding to the frame.

Although in the processing, in general, with a chuck device, the lens is held so as to be chucked from the front and rear surfaces of the lens, since the cutting edge of a processing device makes contact with the lens from the end surface side so as to press the lens, an adhesive tape is adhered to a contact portion between a chuck tip end and the surface of the lens so that even when a lens whose dynamic frictional coefficient is low is chucked, the shaft position of the chuck device is prevented from being displaced by the pressing force thereof (that is, the holding position of the lens is prevented from being displaced). As an example of a means for preventing the holding position of the lens from being displaced with such an adhesive tape, Patent Document 1 is shown.

PRIOR ART DOCUMENTS

Patent Document 1: Japanese Published Unexamined Patent Application No. 2004-122302
Patent Document 2: Japanese Published Unexamined Patent Application No. 2006-330677

SUMMARY OF THE INVENTION

Problems to be Solved by the Invention

Since in the outermost surface of a lens, the final layer of an antireflection layer is an $SiO_2$ layer, it is necessary to provide a fluorine coat layer for preventing a water burn thereof. As the fluorine coat layer, due to the enhancement of its functionality in recent years, a coat layer is provided which has, in addition to the function of water repellency, oil repellency for preventing the adherence of dirt such as sebum, ease of wiping for easily wiping dirt adhered, low frictional properties for further reducing the resistance of a lens surface at the time of wiping and adhesion-preventing properties for avoiding particles of dust, pollen, etc. Various coat layers such as a hydrophilic coating layer for preventing visibility from being lowered such as by water droplets adhered are provided as high-functionality lenses. In order for such high-functionality lenses to be provided, in terms of the stability of performance, cost and productivity, in the stage of a precursor lens before being put into a frame, a coat layer is often formed as a membrane. Since in such lenses, a coat layer in which the adhesion of an adhesive agent is prevented, a coat layer in which a dynamic frictional coefficient is so low as to achieve satisfactory slip, etc., are present, with a normal adhesive tape, it may be difficult to prevent the holding position of the lens from being displaced. Hence, although the use of an adhesive tape whose adhesion is further enhanced can be selected, there is a problem in terms of cost and handleability. Since due to the enhancement of the performance of the coat layer, it is likely that it is more difficult to adhere a tape or that a dynamic frictional coefficient is further lowered, there is a limitation only with the improvement of the tape.

Hence, a displacement prevention coating agent as described below is required; the front and rear surfaces of a lens where for example, a water-repellent coating layer to which a tape is unlikely to be adhered and whose dynamic frictional coefficient is low is formed as a membrane are further coated with the displacement prevention coating agent, and a chuck device is unlikely to be displaced when the front and rear surfaces of the lens are chucked and held with a chuck device serving as, for example, a holding means to which an adhesive tape is adhered and are processed with a processing device.

The following properties are required as necessary conditions for the displacement prevention coating agent described above.

1) A surface tension on a water-repellent lens surface is lowered to show sufficient wettability.

2) In the processing, cooling water is sprayed on a portion to be processed so as to additionally provide lubrication. When the coating agent formed as a membrane is insoluble in water, since this becomes a factor for staining the interior of a cutting device at the time of cutting or damaging the lens, the coating agent needs to be soluble in water. When the coating agent is soluble in water, an operation of removing the coating agent formed as a membrane from the lens after being subjected to lens-shape processing is advantageously performed.

3) Since power in an eye point position is measured with a lens meter immediately before the processing under the assumption that the lens is put into a frame, the lens needs to be transparent.

4) Even when after the lens is coated with the coating agent thereon and is processed, the coat layer is removed, the function of the coating on the lens is not affected, and thus the water repellency is not changed.

As an example of the coating agent for preventing displacement in conventional lens processing, Patent Document 2 is present. However, Patent Document 2 does not satisfy the requirement of 2) above.

Under such conditions, a coating agent which satisfies the requirements of 1) to 4) above and thereby can prevent a displacement in lens processing is required.

The present invention is made with attention focused on the above-described problems present in the conventional art. An object thereof is to provide a displacement prevention coating agent which can prevent a displacement in lens processing, which is soluble in water and which exhibits a transparent appearance at least after being cured.

Means of Solving the Problems

As a first means for solving the above problems, there is provided a displacement prevention coating agent with which at least one of front and rear surfaces of a lens is coated so that when cutting processing is performed on an end surface of the lens where a coat layer is formed as a membrane such that the end surface has a shape corresponding to a frame, a holding position where the front and rear surfaces of the lens are held by a holding means is prevented from being displaced, where the displacement prevention coating agent is formed of an aqueous solution whose main components are a hydrophilic resin, a surfactant having a perfluoro group and a particulate transparent resin composition that is insoluble in water and exhibits a transparent appearance at least after the formation of the membrane.

As a second means, the particle diameter of the particulate transparent resin composition is 0.1 to 1.0 μm.

As a third means, the particulate transparent resin composition is the dispersed phase of an emulsion.

As a fourth means, the emulsion is a water-based emulsion.

As a fifth means, the dispersed phase of the emulsion is formed of one or two or more selected from a group consisting of an ethylene-vinyl acetate copolymer, a vinyl acetate-acrylic copolymer, an acryl-styrene copolymer and polyacryl.

As a sixth means, a perfluoro group of the surfactant is branched.

As a seventh means, the surfactant has a polyoxyethylene ether group.

As an eighth means, the hydrophilic resin is polyvinyl alcohol.

As a ninth means, the hydrophilic resin is methylcellulose.

In the present invention, the surfactant having the perfluoro group is uniformly dispersed in water together with the hydrophilic resin and the emulsion so as to form the aqueous solution. When the lens on which the coat layer has already been formed as a membrane is coated with such an aqueous solution as the displacement prevention coating agent, the surfactant having the perfluoro group is adsorbed to the coat layer on the side of the perfluoro group serving as a hydrophobic group mainly by an intermolecular force. The hydrophilic resin is held on the side of the hydrophilic group of the surfactant mainly by a hydrogen bond. With such a coating agent, the coat layer of the present invention which is unlikely to slip is formed on an upper layer further on the coat layer, and thus the holding position of the front and rear surfaces of the lens held by the holding means when the end surface of the lens is subjected to the cutting processing so as to have a shape corresponding to the frame is prevented from being displaced.

The particulate transparent resin composition which is insoluble in water is dispersed in the aqueous solution without reacting with the hydrophilic resin and the surfactant so as to provide elasticity to the coat layer, and contributes to the provision of a sufficient thickness of the layer (that is, the formation of the bulky layer) in the formation of the coat layer as compared with the case where under the same conditions of the formation of the coat layer, the particulate transparent resin composition which is insoluble in water is not used. The elasticity and the thickness of the layer are increased as described above, and thus a buffering effect is enhanced, with the result that a displacement of the lens held by the holding means is further prevented.

The type of hydrophilic resin is not particularly limited as long as it is transparent after being formed as a membrane (after being cured). Examples thereof include polyvinyl alcohol (PVA), methyl cellulose, carboxymethyl cellulose, hydroxypropylmethyl cellulose, polyvinyl pyrrolidone (PVP), polyethylene glycol, alkaline water soluble polyester, polyacrylate, polyacrylamide, polyethylene oxide, urea resin, starch, agar, alginic acid, carrageenan and gelatin. They may be used singly or may be mixed and used.

As the surfactant having the perfluoro group, for example, a compound is present in which the perfluoro group is branched and which is represented by the rational formula (Chemical Formula 1) below. Chemical Formula 1 is a formula which shows an example of the branched perfluoro group. As a hydrophilic group, an oxyethylene ether group is included. Since the hydrophilic resin having the oxyethylene ether group has flexibility when the coat layer is formed as a membrane, the fixation of the chuck device at the time of the holding is enhanced, and thus it is suitable as the coat layer of this invention. In this formula, the number of oxyethylene groups needs to be eight or more and an even number. When the number of oxyethylene groups is six or less, the molecular weight on the side of the hydrophilic group is relatively low with respect to a hydrophobic group, with the result that it is not suitable as the surfactant of the present invention. On the other hand, when the number of oxyethylene groups is excessively large, the molecular weight on the side of the hydrophilic group is relatively high with respect to the hydrophobic group, with the result that it is not suitable as the surfactant of the present invention. In the surfactant of Chemical Formula 1, it is suitable that the number of oxyethylene groups is 22 or less.

[Chemical Formula 1]

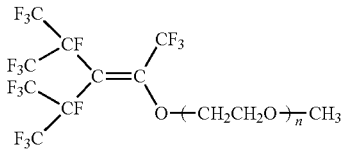

As another example of the surfactant having the perfluoro group, for example, a compound is present in which the perfluoro group is branched and which is represented by the rational formula (Chemical Formula 2) below. This surfactant is a sodium salt in which, instead of the oxyethylene-group in the surfactant of Chemical Formula 1, a benzene sulfonic acid ether is used as the hydrophilic group.

[Chemical Formula 2]

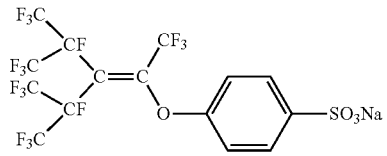

Here, the particulate transparent resin composition which is insoluble in water refers to a structure which is formed of an organic or inorganic resin such as the dispersed phase of an emulsion or hollow particles, whose particle diameter is 1 nm to 1 mm and which is insoluble in water. In the present invention, in order to provide elasticity and form a stable membrane layer, the particle diameter is preferably 0.1 to 1.0 μm. The shape is not necessarily limited to a spherical shape. The particulate transparent resin is in a dispersed state in a solution by an emulsifier or a surfactant, and is a substance which can maintain its transparency even after the hydrophilic resin is dried and cured. In particular, the particulate transparent resin which is formed while containing air bubbles by suspension-emulsion polymerization is dispersed in the resin of the coat layer to provide elasticity. Even the particulate transparent resin which is not subjected to suspension-emulsion polymerization and which is either in hollow particles whose particles are hollow or in the coat layer can be a factor for providing elasticity, and thus it is a conception included herein.

As the emulsion, a water-based emulsion is preferable. When the dispersed phase includes a hydrophobic group and a hydrophilic group, although only the dispersed phase and a dispersion medium may be used, an emulsifier may be used together. Examples of the dispersed phase include an ethylene-vinyl acetate copolymer, a vinyl acetate-acrylic copolymer, an acryl-styrene copolymer and polyacryl. Any one of those forms transparent fine particles. They may be used singly or may be mixed and used. In the dispersed phase, molecules are polymerized together and particles are formed while air bubbles are being taken thereinto, and the particle diameter is preferably increased in order to provide elasticity to the coat layer as long as the membrane formation of the coat layer is not affected. Hence, the particle diameter of the dispersed phase in the state of the coating agent is preferably about 0.1 to 1.0 in order to provide elasticity and to form the membrane layer. The particle diameter can be measured with, for example, a particle size distribution measuring device.

The lens which is coated with the displacement prevention coating agent of the present invention may be either of a plastic lens or a glass lens (inorganic glass). As the inorganic glass, an inorganic glass whose main component is $SiO_2$ can be used. Examples of the plastic include an acrylic resin, a polycarbonate resin, a polyurethane-based resin, a polyester-based resin, an episulfide resin, a polyether sulfone resin, a poly-4-methylpentene-1 resin and a diethylene glycol bis allyl carbonate resin.

On the lens, the coat layer whose dynamic frictional coefficient is low is formed as a membrane, and in the case of the plastic lens, in general, the coat layer is formed as a membrane on an upper layer where a hard coat layer and an anti-reflection layer are formed on a lens base member whereas in the case of the glass lens, the hard coat layer is not necessary, and the coat layer is formed as a membrane on an upper layer where the anti-reflection layer is formed as a membrane. The coat layer may be formed as a membrane without the formation of the anti-reflection layer on the lens.

Here, the hard coat layer is formed of, for example, an organosiloxane-based resin and inorganic oxide fine particles. A hard coat liquid therefor is prepared by dispersing (mixing) the organosiloxane resin and the inorganic oxide fine particle sol in a water or alcohol-based solvent.

As the organosiloxane-based resin, a resin obtained by hydrolyzing and condensing alkoxysilane is preferable.

The antireflection layer is formed by a known method such as a vapor deposition method, an ion sputtering method. In the case of the plastic lens, the antireflection layer is formed as a membrane on an upper layer of the hard coat layer. As the antireflection layer, a multilayer structure membrane based on optical theories is adopted. As the material of the membrane, a general inorganic oxide such as $SiO$, $SiO_2$, $Al_2O_3$, $Y_2O_3$, $Yb_2O_3$, $CeO_2$, $ZrO_2$, $Ta_2O_5$, $TiO_2$, $Nb_2O_5$ or an indium-containing tin oxide (ITO) can be used.

The antireflection layer is formed by sequentially evaporating the thin membranes of a low refractive index layer and a high refractive index layer formed of these materials having different properties by a known means (for example, evaporation) according to an established method. The low refractive index layer is arranged in the uppermost layer.

The coat layer can use a fluorine silane compound or a reactive silicone as a main component. The coat layer can be formed as a membrane by applying a solution prepared by mixing the above component with a non-reactive solvent to the surface of a water-absorbing layer by a wet method such as a dipping method, a spray method, a roll coat method or a spin coat method. The coat layer can also be formed as a membrane by a dry method such as a vacuum deposition method or a CVD method.

Examples of the non-reactive solvent for fluorine-based water-repellent coat include a fluorine-containing solvent, and examples of the non-reactive solvent for silicone-based water-repellent coat include aliphatic hydrocarbon-based solvents such as hexane, heptane and cyclohexane and ketone-based solvents such as acetone, methyl ethyl ketone and methyl isobutyl ketone. The thickness of the coat layer is 1 to 20 nm, and the coat layer is preferably formed so as to have a certain degree of thickness for enhancing antifouling properties. As a high-functionality lens having excellent antifouling properties, the coat layer whose water contact angle is 105 degrees or more and whose dynamic frictional coefficient is 0.20 or less is considered to be a coat layer to which stain is unlikely to be adhered and which adhered stain is easily wipedoff.

Effects of the Invention

The displacement prevention coating agent of the present invention is used when the front and rear surfaces of a lens where a coat layer is formed as a membrane are chucked and held with a holding means to which an adhesive tape is adhered, and thus when the lens is processed with a processing device, a holding position held by the adhesive tape of the lens is unlikely to be displaced.

BEST MODE FOR CARRYING OUT THE INVENTION

Although the present invention will be specifically described using examples, the present invention is not limited to these examples.

Example 1

A [Displacement Prevention Coating Agent]

In Example 1, as a water-soluble resin, polyvinyl alcohol (polymerization degree of 2000, saponification degree of 98.5 mol % or more, made by Nippon Synthetic Chemical Industry Co., Ltd.) was used. In Example 1, as a surfactant, Ftergent 251 (made by Neos Company Ltd.) was used. Ftergent 251 is a fluorine-based surfactant. The main component of Ftergent 251 is a fluorine-based surfactant of n=8 in the rational formula represented by Chemical Formula 1 described above. Furthermore, as an emulsion, an emulsion was used in which an ethylene-vinyl acetate copolymer (made by Sumika Chemtex Co., Ltd.) whose particle diameter is about 0.6 μm was used as a dispersed phase.

10.0 weight % of the water-soluble resin was dissolved at room temperature (25° C.) in 77.45 weight % of water, 0.05 weight % of the fluorine-based surfactant and 2.5 weight % of the emulsion were mixed with this resin aqueous solution and were sufficiently agitated and finally 10.0 weight % of Solmix AP-7 (composition: 85.5 weight % of ethanol, 14.5 weight % of propyl alcohol and 0.2 weight % or less of water, made by Japan Alcohol Corporation) was added, with the result that a displacement prevention coating agent was produced.

B [Lens]

On a plastic lens on which a hard coat layer and an antireflection layer were formed as membranes, which had optical properties with a refractive index of 1.6 and an Abbe number of 40 and in which S power was 3.00 D and C power was 1.00 D, a coat layer as described below was formed as a membrane. As the coat layer, a lens base member where the antireflection layer was formed was coated with an evaporation material ("SURFCLEAR100" made by Canon Optron Inc.) containing a fluorine compound which is chemically bonded by reacting with a silanol group by a resistance heating method. The water contact angle of the coat layer was measured by adhering 2.5 μL of water droplets to an antifouling layer, and the average value thereof was determined to be 117°.

In all of the examples and comparative examples below, the same lens was used.

C [Membrane Formation on Lens with Displacement Prevention Coating Agent]

The plastic lens was immersed in the displacement prevention coating agent at room temperature, and a membrane was formed on the entire surface of the lens at a pulling rate of 100 ram/min. In an oven previously kept at 50° C., drying was performed for 30 minutes, and thus a resin solution was cured.

In all of the examples below, membrane formation was performed in the same manner.

[Evaluation Result]

The result is shown in Table 1.

Example 2

A [Displacement Prevention Coating Agent]

In Example 2, as a water-soluble resin, the same polyvinyl alcohol as in Example 1 was used. As an emulsion, the emulsion was used in which the same ethylene-vinyl acetate copolymer as in Example 1 was used as the dispersed phase.

On the other hand, in Example 2, as a fluorine-based surfactant, Megafac F-444 (made by DIS Corporation) was used.

10.0 weight % of the water-soluble resin was dissolved at room temperature (25° C.) in 77.45 weight % of water, 0.05 weight % of the fluorine-based surfactant and 2.5 weight % of the emulsion were mixed with this resin aqueous solution and were sufficiently agitated and finally 10.0 weight % of Solmix AP-7 was added as in Example 1, with the result that a displacement prevention coating agent was produced.

The description of B and C will be omitted.

[Evaluation Result]

The result is shown in Table 1.

Example 3

A [Displacement Prevention Coating Agent]

In Example 3, as a water-soluble resin, the same polyvinyl alcohol as in Example 1 was used. As a surfactant, the same Megafac F-444 as in Example 2 was used.

In Example 3, as an emulsion, an emulsion was used in which a vinyl acetate-acrylic copolymer (made by DIC Corporation) whose particle diameter is about 0.5 μm was used as a dispersed phase.

10.0 weight % of the water-soluble resin was dissolved at room temperature (25° C.) in 77.45 weight % of water, 0.05 weight % of the fluorine-based surfactant and 2.5 weight % of the emulsion were mixed with this resin aqueous solution and were sufficiently agitated and finally 10.0 weight % of Solmix AP-7 was added as in Example 1, with the result that a displacement prevention coating agent was produced.

The description of B and C will be omitted.

[Evaluation Result]

The result is shown in Table 1.

Example 4

A [Displacement Prevention Coating Agent]

In Example 4, as a water-soluble resin, the same polyvinyl alcohol as in Example 1 was used. As a surfactant, the same Megafac F-444 as in Example 2 was used.

In Example 4, as an emulsion, an acrylic-styrene copolymer (made by DIC Corporation) whose particle diameter is about 0.3 μm was used.

10.0 weight % of the water-soluble resin was dissolved at room temperature (25° C.) in 77.45 weight % of water, 0.05 weight % of the fluorine-based surfactant and 2.5 weight % of the emulsion were mixed with this resin aqueous solution and were sufficiently agitated and finally 10.0 weight % of Solmix AP-7 was added as in Example 1, with the result that a displacement prevention coating agent was produced.

The description of B and C will be omitted.

[Evaluation Result]

The result is shown in Table 1.

Example 5

A [Displacement Prevention Coating Agent]

In Example 5, as a water-soluble resin, the same polyvinyl alcohol as in Example 1 was used. As a surfactant, the same Megafac F-444 as in Example 2 was used.

In Example 5, as an emulsion, an emulsion was used in which polyacryl (made by DIC Corporation) whose particle diameter is about 0.3 μm was used as a dispersed phase.

10.0 weight % of the water-soluble resin was dissolved at room temperature (25° C.) in 77.45 weight % of water, 0.05 weight % of the fluorine-based surfactant and 2.5 weight % of the emulsion were mixed with this resin aqueous solution and were sufficiently agitated and finally 10.0 weight % of Solmix AP-7 was added as in Example 1, with the result that a displacement prevention coating agent was produced.

The description of B and C will be omitted.

[Evaluation Result]

The result is shown in Table 1.

Example 6

A [Displacement Prevention Coating Agent]

In Example 6, as a water-soluble resin, Metolose (made by Shin-Etsu Chemical Co., Ltd.) was used. The main component of Metolose is methylcellulose.

In Example 6, as a surfactant, the same Ftergent 251 as in Example 1 was used. In Example 6, as an emulsion, the emulsion was used in which the same ethylene-vinyl acetate copolymer as in Example 1 was used as a dispersed phase.

1.5 weight % of the water-soluble resin was dissolved at room temperature (25° C.) in 85.95 weight % of water, 0.05 weight % of the fluorine-based surfactant and 2.5 weight % of the emulsion were mixed with this resin aqueous solution and were sufficiently agitated and finally 10.0 weight % of Solmix AP-7 was added as in Example 1, with the result that a displacement prevention coating agent was produced.

The description of B and C will be omitted.

[Evaluation Result]

The result is shown in Table 1.

Comparative Example 1

A [Displacement Prevention Coating Agent]

In Comparative Example 1, as a water-soluble resin, the same polyvinyl alcohol as in Example 1 was used.

In Comparative Example 1, as a surfactant, Ftergent 251 was used. No emulsion was used.

10.0 weight % of the water-soluble resin was dissolved at room temperature (25° C.) in 79.95 weight % of water, 0.05 weight % of the fluorine-based surfactant was mixed with this resin aqueous solution and was sufficiently agitated and finally 10.0 weight % of Solmix AP-7 was added as in Example 1, with the result that a displacement prevention coating agent was produced.

The description of B will be omitted.

C [Membrane Formation on Lens with Displacement Prevention Coating Aagent]

A membrane was formed under the same conditions as in the examples described above except at a pulling rate of 130 mm/min.

[Evaluation Result]

The result is shown in Table 2.

Comparative Example 2

A [Displacement Prevention Coating Agent]

In Comparative Example 2 as well, as a water-soluble resin, the same polyvinyl alcohol as in Examples 1 to 5 and Comparative Example 1 was used.

In Comparative Example 2, as a surfactant, Ftergent 251 was used. No emulsion was used.

12.0 weight % of the water-soluble resin was dissolved at room temperature (25° C.) in 77.95 weight % of water, 0.05 weight % of the fluorine-based surfactant was mixed with this resin aqueous solution and was sufficiently agitated and finally 10.0 weight % of Solmix AP-7 was added as in Example 1, with the result that a displacement prevention coating agent was produced.

The description of B will be omitted.

C [Membrane Formation on Lens with Displacement Prevention Coating Agent]

A membrane was formed under the same conditions as in the examples described above except at a pulling rate of 200 mm/min.

[Evaluation Result]

The result is shown in Table 2.

Comparative Example 3

A [Displacement Prevention Coating Agent]

In Comparative Example 3, as a water-soluble resin, the same polyvinyl alcohol as in Examples 1 to 5 and Comparative Examples 1 and 2 was used.

In Comparative Example 3, as a surfactant, Megafac F-444 was used. No emulsion was used.

10.0 weight % of the water-soluble resin was dissolved at room temperature (25° C.) in 79.95 weight % of water, 0.05 weight % of the fluorine-based surfactant was mixed with this resin aqueous solution and was sufficiently agitated and finally 10.0 weight % of Solmix AP-7 was added as in Example 1, with the result that a displacement prevention coating agent was produced.

The description of B will be omitted.

C [Membrane Formation on Lens with Displacement Prevention Coating Agent]

A membrane was formed under the same conditions as in the examples described above except at a pulling rate of 130 mm/min.

[Evaluation Result]

The result is shown in Table 2.

Comparative Example 4

A [Displacement Prevention Coating Agent]

In Comparative Example 4, as a water-soluble resin, the same
Metolose as in Example 6 was Used.

In Comparative Example 4, as a surfactant, Ftergent 251 was used. No emulsion was used.

1.5 weight % of the water-soluble resin was dissolved at room temperature (25° C.) in 88.45 weight % of water, 0.05 weight % of the fluorine-based surfactant was mixed with this resin aqueous solution and was sufficiently agitated and finally 10.0 weight % of Solmix AP-7 was added as in Example 1, with the result that a displacement prevention coating agent was produced.

The description of B will be omitted.

C [Membrane Formation on Lens with Displacement Prevention Coating Agent]

A membrane was formed under the same conditions as in the examples described above except at a pulling rate of 130 mm/min.

[Evaluation Result]

The result is shown in Table 2.

Performance Evaluation Method (a) Membrane Formation Appearance

The appearance of a protective membrane applied to the surface of an optical lens after being cured was visually inspected, and paint spots and the state when the membrane thickness was increased were evaluated. Criteria are as follows.

•: A membrane was formed on the entire lens, and even when a thick membrane was formed, the appearance was satisfactory.

◦: A membrane was formed on the entire lens.

Δ: A protective membrane was partially separated.

x: A protective membrane was not formed.

Here, • and ◦ indicate that the membrane state is not problematic for use at all, and in particular, in the state of •, even when the membrane thickness is increased, the leveling property is maintained, the membrane can be finely formed and a very satisfactory state is achieved. There is a tendency that satisfactory membrane formation appearance corresponds to the evaluation of lens-shape processing.

(b) Lens-Shape Processing

A double-faced tape for lens processing (LEAP III tape made by Sumitomo 3M Limited) was stuck to the optical center of the lens. Thereafter, a ball grinding machine (LE-9000SX made by NIDEK Co., Ltd.) including a chuck device was used to perform lens-shape processing on the lens. The shaft displacement and the amount of center displacement in the optical center before and after the lens-shape processing were evaluated.

•: No shaft displacement and no center displacement

◦: Shaft displacement was 2° or less and center displacement was 1 mm or less.

Δ: Shaft displacement was 2 to 5° and center displacement was 1 to 2 mm.

x: Shaft displacement was 5° or more or center displacement was 2 mm or more.

(c) Transparency

The power of the optical lens on which the protective membrane was formed was measured with a lens meter (LM-990A made by NIDEK Co., Ltd.). Whether or not the position of the optical center and the power were substantially the same before and after the formation of a resin membrane was evaluated.

○: The position of the optical center was 1 mm or less, and the power was ±0.05 D.

x: The position of the optical center exceeded 1 mm or the power exceeded ±0.05 D.

According to the results of the evaluation, in any of Examples 1 to 6, the membrane formation appearance was substantially satisfactory. It is found from the results that when as a water-soluble resin, polyvinyl alcohol was used, and as an emulsion, an emulsion was used in which an ethylene-vinyl acetate copolymer was used as a dispersed phase, under the same conditions, it is possible to maximize the membrane thickness, and the appearance was satisfactory.

In Examples 1 to 3, the evaluation of the lens-shape processing was substantially satisfactory whereas in Examples 4 to 6, the evaluation of the lens-shape processing was slightly lower but fell within a usable range. It can be considered that the reason why in Examples 4 to 6, the evaluation of the lens-shape processing was slightly lower was that as compared with Examples 1 to 3, the membrane thickness was smaller. In any of the examples, the thickness was substantially uniform, and satisfactory membrane formation results were obtained. In particular, in Examples 1 to 3, the membrane thickness was sufficient, thus a sufficient cushioning property was achieved on the coat layer and hence the shaft displacement and the center displacement were prevented, with the result that satisfactory processing was performed. In Examples 4 to 6, the membrane thickness was not excellent as compared with Examples 1 to 3 but the shaft displacement and the center displacement were substantially prevented by the cushioning property of the emulsion, with the result that the processing was performed. In any of Examples 1 to 6, the transparency was satisfactory.

On the other hand, in the comparative examples, as the membrane thickness was increased, the membrane formation appearance was degraded, and in particular, in Comparative Example 2 where the membrane thickness was set to 15 μm, the uniformity of the membrane formation appearance was not achieved (the membrane was remarkably thick and thin). When the uniformity of the membrane formation appearance is not achieved, a burden is placed on a thin portion, and this causes a shaft displacement and a center displacement, and this also slightly affects the power measurement performed with the lens meter. It can be considered that this is because no emulsion is present and the uniformity of the membrane when the membrane thickness is increased is reduced.

In any of the comparative examples, under the same conditions as in the examples, the lens-shape processing evaluation was not satisfactory. For example, in Comparative Example 1 where the membrane formation appearance was satisfactory, the membrane thickness compares favorably with the examples so as to be 10 μm but the lens-shape processing evaluation was not satisfactory. In other words, it can be considered that in the comparative examples, no emulsion was used, and thus as compared with the examples, the cushioning property of the emulsion was not expected.

TABLE 1

| | Protective membrane components | | |
|---|---|---|---|
| Examples | Protective membrane material | Surfactant | Emulsion |
| 1 | PVA | Ftergent 251 | Ethylene-vinyl acetate copolymer |
| 2 | PVA | Megafac F-444 | Ethylene-vinyl acetate copolymer |
| 3 | PVA | Megafac F-444 | Vinyl acetate-acrylic copolymer |
| 4 | PVA | Megafac F-444 | Acryl-styrene copolymer |
| 5 | PVA | Megafac F-444 | Acryl |
| 6 | Metolose | Ftergent 251 | Ethylene-vinyl acetate copolymer |

| | Evaluation | | | |
|---|---|---|---|---|
| Examples | Membrane thickness (μm) | Membrane formation appearance | Lens-shape processing evaluation | Transparency |
| 1 | 15 | ● | ● | ○ |
| 2 | 15 | ● | ● | ○ |
| 3 | 13 | ○ | ○ | ○ |
| 4 | 10 | ○ | Δ | ○ |
| 5 | 10 | ○ | Δ | ○ |
| 6 | 10 | ● | Δ | ○ |

TABLE 2

| | Protective membrane components | | |
|---|---|---|---|
| Comparative examples | Protective membrane material | Surfactant | Emulsion |
| 1 | PVA | Ftergent 251 | None |
| 2 | PVA | Ftergent 251 | None |
| 3 | PVA | Megafac F-444 | None |
| 4 | Metolose | Ftergent 251 | None |

| | Evaluation | | | |
|---|---|---|---|---|
| Comparative examples | Membrane thickness (μm) | Membrane formation appearance | Lens-shape processing evaluation | Transparency |
| 1 | 10 | Δ | X | ○ |
| 2 | 15 | X | X | ○ |
| 3 | 10 | Δ | X | ○ |
| 4 | 5 | ○ | X | ○ |

What is claimed is:

1. A displacement prevention coating agent with which at least one of front and rear surfaces of a lens is coated so that when cutting processing is performed on an end surface of the lens where a coat layer is formed as a membrane such that the end surface has a shape corresponding to a frame, a holding position where the front and rear surfaces of the lens are held by a holding means is prevented from being displaced, wherein the displacement prevention coating agent comprises an aqueous solution comprising a hydrophilic resin, a surfactant having a perfluoro group, and a particulate transparent resin composition that is insoluble in water and exhibits a transparent appearance at least after the formation of the membrane.

2. The displacement prevention coating agent according to claim 1, wherein the particulate transparent resin composition comprises a dispersed phase of an emulsion.

3. The displacement prevention coating agent according to claim 2, wherein the emulsion is a water-based emulsion.

4. The displacement prevention coating agent according to claim 2, wherein the dispersed phase of the emulsion comprises an ethylene-vinyl acetate copolymer, a vinyl acetate-acrylic copolymer, an acryl-styrene copolymer, polyacryl, or a combination thereof.

5. The displacement prevention coating agent according to claim 1, wherein a particle diameter of the particulate transparent resin composition ranges from 0.1 µm to 1.0 µm.

6. The displacement prevention coating agent according to claim 1, wherein the hydrophilic resin comprises polyvinyl alcohol.

7. The displacement prevention coating agent according to claim 1, wherein the hydrophilic resin comprises methylcellulose.

8. A displacement prevention coating agent with which at least one of front and rear surfaces of a lens is coated so that when cutting processing is performed on an end surface of the lens where a coat layer is formed as a membrane such that the end surface has a shape corresponding to a frame, a holding position where the front and rear surfaces of the lens are held by a holding means is prevented from being displaced,
    wherein the displacement prevention coating agent comprises an aqueous solution comprising a hydrophilic resin, a surfactant having a branched perfluoro group, and a particulate transparent resin composition that is insoluble in water and exhibits a transparent appearance at least after the formation of the membrane.

9. The displacement prevention coating agent according to claim 8, wherein the hydrophilic resin is methylcellulose.

10. The displacement prevention coating agent according to claim 8, wherein the particulate transparent resin composition comprises a dispersed phase of an emulsion.

11. The displacement prevention coating agent according to claim 10, wherein the emulsion is a water-based emulsion.

12. The displacement prevention coating agent according to claim 10, wherein the dispersed phase of the emulsion comprises an ethylene-vinyl acetate copolymer, a vinyl acetate-acrylic copolymer, an acryl-styrene copolymer, polyacryl, or a combination thereof.

13. The displacement prevention coating agent according to claim 8, wherein a particle diameter of the particulate transparent resin composition ranges from 0.1 µm to 1.0 µm.

14. The displacement prevention coating agent according to claim 8, wherein the hydrophilic resin comprises polyvinyl alcohol.

15. A displacement prevention coating agent with which at least one of front and rear surfaces of a lens is coated so that when cutting processing is performed on an end surface of the lense where a coat layer is formed as a membrane such that the end surface has a shape corresponding to a frame, a holding position where the front and rear surfaces of the lens are held by a holding means is prevented from being displaced,
    wherein the displacement prevention coating agent comprises an aqueous solution comprising a hydrophilic resin, a surfactant having a perfluoro group and a polyoxyethylene ether group, and a particulate transparent resin composition that is insoluble in water and exhibits a transparent appearance at least after the formation of the membrane.

16. The displacement prevention coating agent according to claim 15, wherein the particulate transparent resin composition comprises a dispersed phase of an emulsion.

17. The displacement prevention coating agent according to claim 16, wherein the emulsion is a water-based emulsion.

18. The displacement prevention coating agent according to claim 16, wherein the dispersed phase of the emulsion comprises an ethylene-vinyl acetate copolymer, a vinyl acetate-acrylic copolymer, an acryl-styrene copolymer, polyacryl, or a combination thereof.

19. The displacement prevention coating agent according to claim 15, wherein a particle diameter of the particulate transparent resin composition ranges from 0.1 µm to 1.0 µm.

20. The displacement prevention coating agent according to claim 15, wherein the hydrophilic resin comprises polyvinyl alcohol.

* * * * *